(No Model.)

W. E. PIERCE.
WINDOW SCREEN.

No. 483,789. Patented Oct. 4, 1892.

WITNESSES:
H. A. Carhart
C. B. Kinne

INVENTOR,
Ward E. Pierce
BY
Smith & Denison
ATTORNEYS

UNITED STATES PATENT OFFICE.

WARD E. PIERCE, OF PULASKI, NEW YORK.

WINDOW-SCREEN.

SPECIFICATION forming part of Letters Patent No. 483,789, dated October 4, 1892.

Application filed April 27, 1891. Serial No. 390,632. (No model.)

*To all whom it may concern:*

Be it known that I, WARD E. PIERCE, of Pulaski, in the county of Oswego, in the State of New York, have invented new and useful Improvements in Window-Screens, of which the following, taken in connection with the accompanying drawings, is a full, clear, and exact description.

My invention relates to the construction of screens for doors, windows, and other openings where screens are useful and necessary and so arranged as to afford an escape for flies and other insects and avoid their coming in at the same points.

My object is to construct such a screen cheap, durable, and of great utility.

My invention consists in the several novel features of construction which are hereinafter described, and specifically set forth in the claim hereunto annexed. It is constructed as follows, reference being had to the accompanying drawings, in which—

Figure 1:
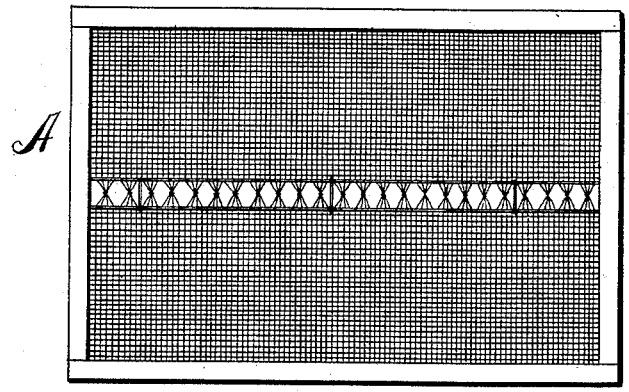
Figure 2:
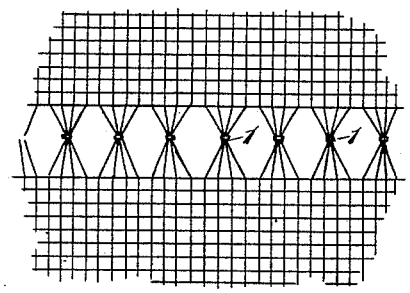
Figure 3:
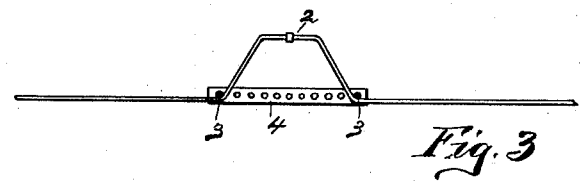

Figure 1 is a plan view of a window-screen constructed with the escapes. Fig. 2 is an end view of the escape construction shown in Fig. 1.

A is a screen adapted for a window-opening, having its vertical or warp wires bent outwardly, as shown at 2.

3 3 are rods placed at the base of the portions bent to form the escapes and are held in position in any ordinary way, preferably, however, by having vertical wires pass alternately under and over them. These bars are held rigidly together by cross-bars 4 4 at intervals desired. It will be observed that the use of these bars is for the purpose of sustaining the bent portion of the screen, which forms the escape.

The series of openings in the arch are created by displacing or omitting a number of the woof-wires and tying the warp-wires in bunches at the apex of the arch.

What I claim is—

A window-screen consisting of a wire-screen body, a continuous arch transverse thereto, created by bending said body outward, and a series of openings in said arch created by displacing or omitting a number of the woof-wires and tying the warp-wires in bunches at the apex of the arch, in combination with perforated stay-bars across the base of the arch and rods connected to the screen-body on either side of the arch and passing through and adjustable in said stay-bars to vary the spring of said arch and the size of said openings therein longitudinally, substantially as described.

In witness whereof I have hereunto set my hand this 21st day of April, 1891.

WARD E. PIERCE.

In presence of—
H. P. DENISON,
C. B. KIMEL.